United States Patent [19]

Donley

[11] 4,100,330

[45] Jul. 11, 1978

[54] METHOD FOR COATING GLASS WITH SILICON AND A METAL OXIDE AND RESULTING PRODUCT

[75] Inventor: Harold E. Donley, Oakmont, Pa.

[73] Assignee: PPG Industries, Inc., Pittsburgh, Pa.

[21] Appl. No.: 782,150

[22] Filed: Mar. 28, 1977

[51] Int. Cl.$^2$ .............................................. C03C 15/00
[52] U.S. Cl. ....................................... 428/429; 65/32; 65/60 A; 65/60 D; 427/167; 427/419 A; 427/419 B; 427/225; 428/448
[58] Field of Search ............... 428/432, 428, 429, 448; 65/60 A, 60 D, 32; 427/109, 167, 419 A, 419 B, 225

[56] References Cited

U.S. PATENT DOCUMENTS

| 3,185,586 | 5/1965 | Saunders | 65/60 |
|---|---|---|---|
| 3,410,710 | 11/1968 | Mochel | 428/167 X |
| 3,652,246 | 3/1972 | Michelotti et al. | 65/60 X |
| 3,658,568 | 4/1972 | Donley | 427/167 X |
| 3,660,061 | 5/1972 | Donley et al. | 65/60 X |
| 3,978,272 | 8/1976 | Donley | 427/419 B X |

FOREIGN PATENT DOCUMENTS

| 2,115,516 | 10/1972 | Fed. Rep. of Germany | 427/109 |
|---|---|---|---|
| 830,179 | 7/1975 | United Kingdom. | |

Primary Examiner—Robert L. Lindsay, Jr.
Attorney, Agent, or Firm—Donna L. Seidel

[57] ABSTRACT

Glass is heated to a temperature of at least about 400° C. and contacted sequentially with a silane-containing gas and an organometallic composition which thermally decompose to form, respectively, a coating layer of silicon and a coating layer of metal oxide on the glass surface. The resultant coated glass article is more durable than a silicon coated glass article and has better solar energy control properties than a metal oxide coated glass article.

9 Claims, No Drawings

METHOD FOR COATING GLASS WITH SILICON AND A METAL OXIDE AND RESULTING PRODUCT

FIELD OF THE INVENTION

The present invention relates generally to the art of coating glass and more particularly to improvements in the art of coating glass with metal oxides by pyrolytic techniques.

DESCRIPTION OF THE PRIOR ART

The art of pyrolytic coating of glass is characterized by the following patents.

U.S. Pat. No. 3,185,586 to Saunders et al. teaches the formation of metal oxide films by the thermal decomposition of metal 2-ethylhexanoates.

U.S. Pat. No. 3,410,710 to Mochel teaches that metal oxide coatings are formed on a hot refractory substrate by contacting the substrate with coating compositions containing metal diketonates which thermally decompose to form metal oxides.

U.S. Pat. No. 3,652,246 to Michelotti and Henry and U.S. Pat. No. 3,660,061 to Donley, Rieser and Wagner teach the application of metal oxide coatings by pyrolysis onto the surface of a continuous ribbon of float glass.

U.S. Pat. No. 3,658,568 to Donley teaches that metal oxide films may be formed by pyrolyzing metal carboxylates containing a quaternary alpha carbon atom such as metal neodecanoates.

U.S. Pat. No. 3,978,272 to Donley teaches a pyrolytic method for coating a glass substrate with a first layer of silver and a second layer of metal oxide.

Belgian Pat. No. 830,179 to Kirkbride et al. assigned to Pilkington Brothers Ltd. teaches a method for coating glass with silicon. The method involves contacting a hot glass surface with a silane-containing gas in a non-oxidizing environment.

SUMMARY OF THE INVENTION

The present invention encompasses a method for coating a glass substrate with a first film of silicon and a second film of metal oxide by pyrolytic coating techniques. The invention further encompasses the resultant coated article which is more durable than a silicon coated article and which has better solar energy control properties than a metal oxide coated article.

The method of the present invention involves maintaining the glass surface at a temperature of at least about 400° C. and contacting the hot glass surface first with a silane-containing gas in a non-oxidizing atmosphere to form a silicon film and second with a solution of an organometallic coating compound in an oxidizing atmosphere to form a metal oxide film.

DETAILED DESCRIPTION OF THE PREFERRED EMBODIMENTS

The preferred commercially practicable embodiment of the method of the present invention involves moving a hot glass substrate, preferably a continuous ribbon of float glass at a temperature of at least about 400° C., in relation to a first coating apparatus through which a silane-containing gas is released toward the hot glass surface in a non-oxidizing atmosphere to deposit a coating of silicon, and a second coating apparatus through which a solution of an organometallic coating reactant is released toward the hot glass surface in an oxidizing atmosphere to deposit a coating of metal oxide.

In the first coating step, the temperature of the substrate is preferably between about 500° and about 700° C. In a typical float glass operation, where a ribbon of glass is being advanced along a bath of molten metal over which a protective atmosphere is maintained, the silane-containing gas is preferably released in a hot zone where the temperature is between about 600° and about 670° C. and within the protective atmosphere of nitrogen and hydrogen typically present. The rate of movement of the glass ribbon is generally dictated by glass making considerations. Therefore, the coating parameters are adjusted in relation to the rate of advance of the glass substrate. The concentration of the silane in the gas in controlled to provide the desired coating thickness, while the gas flow rate is regulated to insure uniformity of the coating.

The silane-containing gas preferably comprises from about 0.1 percent to about 20 percent by volume of a silane, for example, monosilane ($SiH_4$), up to about 10 percent by volume of hydrogen, and from about 70 percent to about 99.9 percent of an inert gas such as nitrogen. The temperature of the gas is maintained well below 400° C. prior to contacting the hot glass surface to prevent premature decomposition of the silane. A protective atmosphere of 90–95 percent nitrogen and 5–10 percent hydrogen is preferred. A detailed description of apparatus and method for carrying out this first coating step is found in Belgian Pat. No. 830,179. The silicon coating typically has a thickness of about 250 Angstroms to about 600 Angstroms, preferably from about 300 Angstroms to about 450 Angstroms.

After the silicon coated glass ribbon has advanced beyond the non-oxidizing atmosphere, but while it is still at a temperature sufficient to pyrolyze the organometallic coating reactant, preferably between about 250° and about 650° C., the silicon coated glass surface is contacted with a coating composition containing an organometallic coating reactant which thermally decomposes on contact with the hot glass surface in an oxidizing atmosphere to form a metal oxide coating.

The preferred organometallic coating reactants include metal diketonates, such as cobalt, iron, nickel, and chromium acetylacetonates; metal carboxylates, such as cobalt, iron, nickel and chromium 2-ethylhexanoates; and quaternary metal carboxylates, such as cobalt, iron, nickel, chromium, vanadium and titanium neodecanoates, neohexanoates and neoheptanoates. The coating reactants are preferably dissolved in an organic solvent at a concentration of about 0.1 to 10 percent by weight of the metal.

Various aromatic and aliphatic solvents are suitable, particularly highly volatile solvents such as benzene, toluene and heptane. Preferred solvents, for safety reasons, include halocarbons and halogenated aliphatic hydrocarbons such as trichloroethane or methylene chloride. The quaternary metal carboxylates may be solubilized in water with ammonia.

A solution of coating reactant may be vaporized and transported to the hot glass surface where the coating reactant pyrolyzes to deposit a metal oxide film by chemical vapor deposition in an oxidizing atmosphere. However, it is preferred to spray a solution of coating reactant in liquid form onto the hot glass surface. A detailed description of apparatus and method for carrying out this second coating step is found in U.S. Pat. No. 3,660,061 which description is incorporated herein by reference. The metal oxide coating typically has a thickness of about 300 Angstroms to about 600 Angstroms, preferably about 450 Angstroms to about 500 Angstroms.

The resultant silicon/metal oxide coated glass has better abrasion resistance than silicon coated glass and better solar energy control properties than metal oxide coated glass. The present invention will be further understood from the description of specific examples which follow.

EXAMPLE I

Clear float glass 6 millimeters in thickness is maintained in an atmosphere consisting of about 93 percent by volume nitrogen and about 7 percent by volume hydrogen while the glass surface, at a temperature of about 610° C., is contacted with a gaseous mixture of about 5 percent by volume monosilane and about 95 percent by volume nitrogen. A silicon coating approximately 350 Angstroms thick is deposited.

The silicon coated glass appears brown by transmission with a luminous transmittance of 34 percent and silver in reflection with a luminous reflectance of about 56 percent and a dominant wavelength of reflected light of about 480 nanometers. The shading coefficient is 0.52 for a monolithic coated sheet and 0.47 for a double glazed unit.

The silicon coating is completely removed from the glass by 20 strokes of uniform force with a slurry of cerium oxide or pumice. The silicon coating is also completely removed by immersion for 30 seconds in a solution of 200 grams of sodium hydroxide in 1000 milliliters of water at 200° F.

EXAMPLE II

Clear float glass 6 millimeters in thickness and at a temperature of about 590° C. is contacted in air with a spray of a solution containing 32.0 grams of cobalt acetylacetonate, 7.0 grams of iron acetylacetonate, 8.5 grams of chromium acetylacetonate, 12 cubic centimeters (cc) of metacresol, and 189 cubic centimeters (cc) of solvent which is equal parts by volume methylene chloride and trichloroethylene. A metal oxide coating approximately 500 Angstroms thick is deposited.

The metal oxide coated glass has a luminous transmittance of about 39 percent and luminous reflectance of about 35 percent with a dominant wavelength of reflected light of 556 nanometers. The shading coefficient for a monolithic coated sheet is 0.60.

The metal oxide coating is not damaged by 20 strokes of uniform force with a slurry of cerium oxide or pumice, nor is it removed from the glass surface by immersion for 30 seconds in a solution of 200 grams of sodium hydroxide in 1000 cubic centimeters (cc) of water at 200° F.

EXAMPLE III

Clear float glass is coated with silicon as in Example I, then with metal oxides as in Example II to a final luminous transmittance of 26 percent.

The silicon/metal oxide coated glass has a luminous reflectance of 58 percent, similar to the silicon coated glass, but the dominant wavelength of reflected light is 556 nanometers, similar to the metal oxide coated glass. Moreover, the shading coefficient for a monolithic coated sheet is 0.46, lower than either the silicon or metal oxide coated sheets, and comparable to the silicon coated sheet in a double glazed unit.

The silicon/metal oxide coating is not damaged by 20 strokes of uniform force with a slurry of cerium oxide or pumice is it removed by immersion for 30 seconds in a solution of 200 grams of sodium hydroxide in 1000 cubic centimeters of water at 200° F.

EXAMPLE IV

Clear float glass is coated with silicon as in Example I, and contacted as in Example II with a solution containing 529.6 grams cobalt acetylacetonate, 204.0 grams nickel acetylacetonate, 188 cubic centimeters of cresol, 946 cubic centimeters of methanol and 2850 cubic centimeters of the solvent of Example II.

A metal oxide film which is 65 parts by weight cobalt to 35 parts nickel is formed over the silicon. The final luminous transmittance is 26.5 percent. The coated article passes both the cerium oxide and pumice abrasion tests and is more alkali resistant than the silicon coated article of Example I.

EXAMPLE V

Clear float glass is coated with silicon as in Example I, and contacted as in Example II with a solution containing 521 grams cobalt acetylacetonate, 179.6 grams iron acetylacetonate, 90 grams chromium acetylacetonate, 29 grams nickel acetylacetonate, 188 cubic centimeters cresol, 400 cubic centimeters methanol and 3000 cubic centimeters of the solvent of Example II.

A metal oxide film which is 64 parts by weight cobalt to 21 parts iron, 10 parts chromium and 5 parts nickel is formed over the silicon. The final luminous transmittance is 27.0 percent. The coated article passes both abrasion tests and is more alkali resistant than the silicon coated article of Example I.

EXAMPLE VI

Silicon coated glass as prepared in Example I is contacted as in Example II with a solution containing 149.6 grams iron acetylacetonate, 44.0 grams nickel acetylacetonate, 47 cubic centimeters cresol, 236.5 cubic centimeters methanol and 712 cubic centimeters of the solvent of Example II.

A metal oxide film which is 70 parts by weight iron to 30 parts nickel is formed over the silicon. The final luminous transmittance is 31.0 percent. The coated article passes both abrasion tests and is more alkali resistant than the silicon coated article of Example I.

EXAMPLE VII

Silicon coated glass as prepared in Example I is contacted as in Example II with a solution of dibutyl tin diacetate in solvent which is equal parts of volume methylene chloride and trichloroethylene. The solution is 0.25 percent by weight tin.

A tin oxide film is formed over the silicon resulting in a final luminous transmittance of 35.0 percent. The coated article passes both abrasion tests and is more alkali resistant than the silicon coated article of Example I.

EXAMPLE VIII

Silicon coated glass prepared according to Example I is contacted as in Example II with a solution of titanium diisopropyldiacetylacetonate in the solvent of Example II, the solution containing 2.5 percent by weight titanium.

A titanium oxide film is formed over the silicon resulting in a final luminous transmittance of 32.0 percent. The coated article passes both abrasion tests and is more alkali resistant than the silicon coated article of Example I.

EXAMPLE IX

Silicon coated glass prepared according to Example I is contacted as in Example II with a solution of nickel acetylacetonate in a solvent mixture of 188 cubic centimeters cresol, 946 cubic centimeters methanol and 2850 cubic centimeters of the solvent of Example II. The solution contains 2.5 percent by weight nickel.

A nickel oxide film is formed over the silicon resulting in a final luminous transmittance of 32.0 percent. The coated article passes both abrasion tests and is as alkali resistant as the coated article of Example II.

Spectral and performance data for the samples prepared according to the foregoing examples are summarized in the following table.

TABLE

SPECTRAL PROPERTIES AND DURABILITY OF COATED GLASS

| EXAMPLE | COATING Silicon | COATING Metal Oxide | LUMINOUS TRANSMITTANCE (Percent) | ABRASION TEST (Removed by 20 strokes) Cerium Oxide | ABRASION TEST Pumice | ALKALI TEST (Removed by Immersion for 30 seconds in 200g NaOH/1000cc $H_2O$ at 200° F.) |
|---|---|---|---|---|---|---|
| I | Si | — | 31.5 | Yes | Yes | Yes |
| II | — | Co/Fe/Cr | 39 | No | No | No |
| III | Si | Co/Fe/Cr | 26 | No | No | No |
| IV | Si | Co/Ni | 26.5 | No | No | No |
| V | Si | Co/Fe/Cr/Ni | 27 | No | No | No |
| VI | Si | Fe/Ni | 31 | No | No | No |
| VII | Si | Sn | 35 | No | No | No |
| VIII | Si | Ti | 32 | No | No | No |
| IX | Si | Ni | 32 | No | No | No |

The above examples are offered to illustrate the present invention and do not limit its scope which is defined by the following claims.

I claim:

1. A method for producing a coated glass article comprising the steps of:
   a. maintaining a glass substrate at a temperature of at least about 400° C. in a non-oxidizing atmosphere;
   b. contacting a surface of the glass substrate with a silane-containing gas for a sufficient time to form a silicon coating on the glass surface;
   c. maintaining the silicon coated glass at a temperature of at least about 250° C. in an oxidizing atmosphere; and
   d. contacting the silicon coated surface with a coating composition comprising a metal compound which, upon contact with the hot glass surface, thermally decomposes to form a metal oxide coating over the silicon coating on the glass surface.

2. The method according to claim 1, wherein the silane-containing gas is a mixture comprising monosilane and an inert carrier gas.

3. The method according to claim 2, wherein the silane-containing gas is a mixture comprising from about 0.1 to 20 percent by volume silane, up to about 10 percent by volume hydrogen and from about 70 to 99.9 percent by volume nitrogen.

4. The method according to claim 1, wherein the silicon coated surface is contacted with a coating composition comprising an organometallic compound of a metal selected from the group consisting of cobalt, iron, chromium, copper, manganese, nickel, tin, vanadium, titanium and mixtures thereof.

5. The method according to claim 4, wherein the organometallic compound is the acetylacetonate of a metal selected from the group consisting of cobalt, iron, chromium, copper, manganese, nickel and mixtures thereof.

6. The method according to claim 5, wherein the organometallic compound is dissolved in a solvent selected from the group consisting of aliphatic and olefinic halocarbons and halogenated hydrocarbons.

7. The method for producing a coated glass article according to claim 1, wherein
   a. a glass substrate is maintained at a temperature from about 500° to about 700° C. in an atmosphere comprising about 90 to 95 percent nitrogen and about 5 to 10 percent by volume hydrogen;
   b. a surface of the glass substrate is contacted with a gaseous mixture of about 0.1 to 20 percent by volume monosilane, up to about 10 percent by volume hydrogen and about 70 to 99.9 percent by volume nitrogen for a sufficient time to form a silicon coating about 250 Angstroms to about 600 Angstroms in thickness on the glass surface;
   c. the silicon coated glass is maintained at a temperature from about 400° to about 600° C. in air; and
   d. the silicon coated surface is contacted with a coating composition comprising a solvent and about 0.1 to 10 percent by weight of metal of an organometallic compound of a metal selected from the group consisting of cobalt, iron, chromium, copper, manganese, nickel, tin, vanadium, titanium and mixtures thereof which compound thermally decomposes, upon contact with the hot glass surface, to form a metal oxide coating from about 300 Angstroms to about 600 Angstroms in thickness upon the silicon coated surface.

8. A coated article prepared according to the method of claim 1.

9. A coated article prepared according to the method of claim 7.

* * * * *